Patented Mar. 28, 1933

1,903,041

UNITED STATES PATENT OFFICE

RALPH E. HALL AND HENRY A. JACKSON, OF MOUNT LEBANON, PENNSYLVANIA, ASSIGNORS TO JOHN M. HOPWOOD, OF DORMONT, PENNSYLVANIA

WATER TREATMENT

No Drawing.    Application filed November 23, 1929.   Serial No. 409,416.

The present invention relates to water treatment, and particularly to the treatment of steam boiler water, and more especially to the treatment of the steam boiler water by chemicals whose aqueous solutions are either alkaline or of relatively slight acidity, but which through changes wrought in their character at the temperatures and under the conditions obtaining in the boiler water undergo transformation which increases their alkali-neutralizing capacity. The solutions of the treating chemicals, which may be either alkaline or of relatively slight acidity, can be handled with little if any corrosive attack upon the supplying or injecting devices.

In its more specific embodiment, the invention relates to the use of treating chemicals which, in addition to being transformed in the boiler water into substances with greater alkali-neutralizing capacity, supply radicals, after the transformation, which will combine in the boiler water with the scale-forming alkaline-earth metals to form non-adherent sludge, and thereby prevent the formation of adherent boiler scale.

The specific and preferred chemicals having these properties are the metaphosphates and pyrophosphates which are transformed by chemical change in the highly heated boiler water with relative rapidity into acid orthophosphates yielding orthophosphate radical which maintains the equilibrium in the boiler water necessary for the prevention of scale, and acid hydrogen which counteracts the tendency to excessive concentration of alkalinity in the boiler water.

Treating chemicals, such as the metaphosphates and pyrophosphates, cause or permit to be maintained the necessary alkalinity of the feed water to prevent corrosive attack upon the feed water heaters and lines. The calcium metaphosphates and the calcium pyrophosphates are considerably more soluble than tricalcic orthophosphate. Hence, the addition of the metaphosphate and pyrophosphate to the feed water is much less productive of supersaturation of insoluble calcium salts therein and hence less productive of any tendency to form feed line deposits.

In modern steam generating practice, every effort is made for efficiency, both from the standpoint of conserving fuel and from that of deriving most steam from each generating unit. In order to obtain the desired efficiency it is essential that all surfaces of the steam-generating system making contact with water be protected from deterioration, whether such deterioration consist in formation of scale thereon, or impairment thereof by corrosion, corrosion fatigue, or the effects sometimes described as "embrittlement", and that those conditions be established and continuously maintained in the boiler water which are best adapted to minimizing any entrainment thereof in the effluent steam.

We will define first conditions in the contacting water that best prevent dissolution of the retaining iron or steel surfaces, whether this dissolution be general over the surfaces or manifest itself in form of pits or grooves.

From all standpoints it is best that content of dissolved oxygen in the water be made as small as possible, and more especially beginning with the point in the system at which the temperature is raised above ordinary room or outside temperature. Inasmuch as this factor in preventing corrosion is not of specific application in this specfication, we will assume in the following discussion that provision is made for satisfactory deaeration of the water.

It has been established that a slight alkalinity in water making contact with iron or steel best prevents corrosion. The pH value of a sample drawn from any point of the system should be in no case less than 8, (the determination is made by any of the usual methods after the sample is cooled to approximately room temperature) and is better maintained somewhat higher than this. Thus, in the feed water heater, feed lines and economizer, a pH value of the water of 8, while largely minimizing any corrosion, is not as effective therefor as a pH value of between 9 and 10. In the boiler water proper, the pH value (determined as described above) should never be below 10, and is best maintained slightly higher, approximately 11.0 to 11.5 in a great number of cases.

If the feed water is softened by one of the various types of lime-soda softener, with correct operation, its pH value in general will lie within the limits specified above for heater, feed lines and economizer, and thus is not corrosive thereto. Admixture of pure return condensate with the softened water, by dilution of the latter, lowers its pH value, and in case of high percentage of condensate, may reduce it below the desirable point, so that increment thereto by addition of solution of appropriate alkaline chemical may be advisable. The boiler water, however, integrates this slight alkalinity of the feed water into higher alkalinity in itself—the alkalinty does not pass out of the boiler with the steam—and in inverse proportion to the blowdown. Conservation in blowdown is one factor in obtaining efficiency of operation, but because the boiler water represents a summation of, and therefore contains many times the alkalinity of the feed water, limitation of the boiler-water alkalinity to the desirable concentration must frequently be obtained, either by greater blowdown than necessary for other purposes, by maintenance of less alkalinity in the feed water than desirable, by introduction of an acid ingredient directly to the boiler water with all the operating difficulties incident thereto, or by other means.

It is extremely important that the boiler water be maintained alkaline, but that the alkaline concentration be confined rather closely to a pH value of over about 10, but not over about 11.5. The boiler water should be alkaline to this extent, because this condition best obviates any tendency of the boiler metal to dissolve or to pit, and also gives best and most economical use of the conditioning chemical. But it should exceed this limit as little as possible because of the tendency of increasing alkalinity to originate or augment carry-over of boiler water in the steam and because of its inimical effect on the boiler metal, especially if it concentrates in seams or around rivets, because by its cleansing or peptizing effect, or at higher concentrations, its ability actually to cause dissolution of the metal or protective films integral therewith, it may be accelerative of corrosion-fatigue or "embrittlement", and hence rupture of the boiler metal.

With use of natural untreated water as make-up, or of water treated in a zeolite softener, the difficulties are increased. Many, in fact, most natural waters, contain bicarbonate associated with calcium and/or magnesium and/or alkali metal as sodium. In the zeolite softener, sodium is substituted for the calcium and/or the magnesium, and in the boiler, sodium bicarbonate decomposes to form first sodium carbonate, which in turn, largely suffers decomposition into caustic soda.

In this manner, tremendous alkalinity may be developed in the boiler water. At the same time, the pH value of the feed water may be insufficient to prevent corrosion of the feed water lines and pumps unless alkali is added thereto. If natural water is treated by trisodium phosphate, the same development of sodium bicarbonate and finally of sodium hydroxide in the boiler water occurs, but its use has the advantage of increasing the pH value of the feed water. Usually the development of excessive alkalinity in the boiler water, occurs as the result of using pretreatment of the feed water, either by the zeolite process or by the lime soda process, or by direct treatment with the alkali-metal orthophosphates or carbonates. However, there are natural waters which contain alkali-metal bicarconate, and these without treatment, if used for boiler feed, will develop high alkalinity in the boiler water.

For protection of the boiler metal from "embrittlement", it is considered advisable by many (as in Suggested rules for care of power boilers, Section VII (1927) paragraph CA—5, The American Society of Mechanical Engineers), that the content of sodium sulphate in the boiler water bear continuously to the total alkalinity therein a ratio which is definite for any operating pressure, but which increases with increase of operating pressure. Thus, if a minimal value of the alkalinity in the boiler water is not assured, maintenance of these ratios engenders difficulties in two ways, namely:

1. Large quantities of sodium sulphate must be maintained in the boiler water, and particularly at higher operating pressures where it is least desirable, thus, on the one hand occasioning difficulty by reason of bad boiling conditions and concomitant poor quality of steam, endangering continuity of operation through failure of superheater tubes, or damage to prime movers; or on the other hand, requiring unnecessarily large blowdown to obviate these difficulties. Furthermore, under these circumstances, it is frequently necessary to augment the sodium sulphate present in the natural water by its addition thereto, and thus needless increase of cost of water conditioning is incurred.

2. The large amount of sodium sulphate in the boiler water greatly augments possibilities of scale formation and thus endangers continuity of operation.

Maintenance of the recommended ratios of sodium sulphate to total alkalinity in the boiler water renders well nigh impossible cleanliness of surface essential in high-pressure or high-rating boilers, whether the feed water consist of return condensate, evaporated water, lime-soda or zeolite treated water, unless there be maintained continuously in the boiler water available in solution those concentrations of some stable radical as orthophosphate requisite to govern the character of any solid phase that forms, and thereby insure its formation as non-adherent sludge. In condensate returns and evaporated water, calcium is practically invariably present, due, respectively, to in-leakage of cooling water and carry-over.

Effluent water from the lime-soda softener even when it is operated most efficiently, contains sufficient calcium so that its accumulation in the boiler water, in conjunction with the sodium sulphate required for protection from "embrittlement", results in exceeding the solubility-product relations of calcium and sulphate at pressures above about 160 pounds, and hence, in scale deposition. While the calcium content of water from a carefully operated zeolite softener in good condition is usually less than that from the lime-soda softener, possibility of scale formation is lessened but not obviated, and certainty of scale prevention with a zeolite-softened water, as well as with all others, abides in the maintenance of essential conditions in the boiler water, as described in United States Patents Nos. 1,613,656 and 1,613,701, issued to Ralph E. Hall on January 11, 1927. Presence of a stable radical as orthophosphate available in solution in the boiler water, becomes particularly necessary in view of higher pressures and ratings, and the desirable small, closely controlled alkalinities in the boiler water that characterize present steam-generating practice.

Use of disodium or monosodium phosphate in the feed water is effective in decreasing the total alkalinity developed in the boiler water, but has little effect on or is inimical to the maintenance of desired pH values in the feed water.

These difficulties may be met by addition of acid to the feed water to destroy its bicarbonate, removal of the dissolved carbon dioxide by satisfactory means, and subsequent addition of alkalinity by means of an alkaline chemical, as trisodium phosphate, in amount sufficient to develop the desired pH value in the feed water; or by means of a returning continuous blowdown from the boiler at appropriate point to the feed water, so that the boiler-water alkalinity is made use of in developing the desirable pH value in the feed water. (This is practically without value when the pH value of the boiler water is maintained between 10 and approximately 11). These methods are relatively complex and costly, and require very careful control.

There is, therefore, a distinctly difficult problem presented by the necessity of maintaining an alkaline condition in the feed water, and yet limiting concentration of alkalinity in the boiler water to that compatible with safe or desirable operating conditions, and at the same time continuously maintaining in the boiler water a sufficient concentration of a radical, such as orthophosphate, to insure the precipitation of calcium and/or magnesium as non-adherent sludge instead of adherent scale.

The solubility of tricalcic phosphate is very slight, and addition of orthophosphate radical to the feed water very frequently occasions supersaturation therein with respect to tricalcic phosphate. This supersaturation is not immediately completely relieved by separation of solid phase, but persists, with the result that solid phase continues to separate along the path of the feed water to the boiler, and particularly at points tending to destroy the condition of supersaturation, as where the temperature of the feed water is considerably raised, as in an economizer or a heater fed with steam bled from one of the stages of the turbine. Separation of solid phase under these conditions occurs in part at least as scale, adherent to feed lines, feed water pumps, heaters, economizers, etc., and at times in desuperheating equipment.

A solution of these various difficulties lies in derivation of the essential phosphate or other conditioning-chemical concentrations in the boiler water by addition to the feed water of conditioning chemicals whose calcium compounds are relatively soluble, and which are either alkaline of reaction themselves when dissolved in water, or offer no difficulties to maintenance of the desired pH value in the feed water, but which, when subjected for a period to higher temperature as that of the boiler water, provide the necessary orthophosphate or other conditioning radical therein, and simultaneously neutralize part of the boiler-water alkalinity.

As one example, alkali-metal pyrophosphates and metaphosphates meet these requirements. Thus, if sodium pyrophosphate ($Na_4P_2O_7$) is heated with water at sufficient temperature, the folowing reaction occurs:

(1)  $Na_4P_2O_7 + H_2O \rightarrow 2Na_2HPO_4$

If sodium metaphosphate ($NaPO_3$) (or a polymerized form thereof) is so heated, the reaction is as follows:

(2) 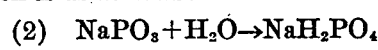 $NaPO_3 + H_2O \rightarrow NaH_2PO_4$

If for any reason addition of acid to the feed water be advisable, then use of the acid alkali-metal pyrophosphate salts or of metaphosphoric or pyrophosphoric acids is advantageous, both from the standpoint of the relatively large solubility of calcium metaphosphate or pyrophosphate, thus averting feed line deposits, and the increased neutralization of alkalinity that is obtained in the boiler water because of the transformation of these substances to acid orthophosphates at boiler water temperatures. The transformations that occur may be represented as folows:

(3) $Na_2H_2P_2O_7 + H_2O \rightarrow 2NaH_2PO_4$
(4) $H_4P_2O_7 + H_2O \rightarrow 2H_3PO_4$
(5) $HPO_3 + H_2O \rightarrow H_3PO_4$ Reactions (2) and (5) may occur in steps thus:

(6) $2NaPO_3 + H_2O \rightarrow Na_2H_2P_2O_7$
$2HPO_3 + H_2O \rightarrow H_4P_2O_7$ the further change to orthophosphate occurring in accordance with reactions (3) and (4).

The above equations show that addition of a pyrophosphate or a metaphosphate in appropriate amounts to the feed water will result in the maintenance of desired quantities of orthophosphate radical in the boiler water. These reactions are hastened by the temperature of the boiler water and by the continuous removal therefrom of the end product, namely, orthophosphate, by any incoming calcium, thus minimizing the establishment of any equilibrium in the reaction.

The pyrophosphoric acid and metaphosphoric acid may be prepared by heating orthophosphoric acid. Upon heating the orthophosphoric acid ($H_3PO_4$), to appropriate temperature, water is driven off, producing pyrophosphoric acid ($H_4P_2O_7$). Upon heating, two molecules of orthophosphoric acid produce one molecule of pyrophosphoric acid, as follows: $2H_3PO_4 = H_4P_2O_7 + H_2O$. The loss of the water causes a rearrangement of the atoms within the acid molecule with the result that the pyrophosphoric acid produced has less alkali-neutralizing capacity than the orthophosphoric acid from which it was produced. Upon heating to appropriately higher temperature, more water is driven off and the pyrophosphoric acid is transformed into metaphosphoric acid ($HPO_3$), which has still less alkali-neutralizing capacity than the pyrophosphoric acid from which it was produced, due to a still further atomic rearrangement. Both the pyrophosphoric acid and the metaphosphoric acid may be neutralized by alkali-metal hydroxide, such as sodium hydroxide, yielding alkali-metal pyrophosphate or alkali-metal metaphosphate.

Likewise, by heating at appropriate temperatures, acid orthophosphate salts may be converted into pyro- or metaphosphate salts. The terms "pyrophosphate" and "metaphosphate" when used without other qualification are intended to include pyrophosphoric acid and metaphosphoric acid, as well as the salts of these acids, since pyrophosphoric acid and metaphosphoric acid may be considered as hydrogen pyrophosphate and hydrogen metaphosphate. Similarly, by the term "molecularly dehydrated phosphate" we intend to include the acids as well as the salts.

The water solutions of pyrophosphoric acid and metaphosphoric acid or salts thereof tend to revert to the orthophosphate form, the speed of reversion depending upon the attendant circumstances. The reversion is relatively slow at normal room temperatures and particularly in dilute alkaline solutions. The reversion, however, is accelerated by the high temperature of the boiler water and the removal of the orthophosphate end-product by the calcium in the boiler water. The reversion from the meta- or pyro-condition to the ortho-condition is relatively slow in the feed lines where the temperature is lower, but rapid in the boiler where the temperature is higher.

The reversion is due to the recombination of water with the pyro- or metaphosphate. By such rehydration, sodium pyrophosphate which has an alkaline reaction, is converted into disodium monohydrogen orthophosphate whose hydrogen is an acid hydrogen and is therefore capable of neutralizing alkalinity. Similarly, sodium metaphosphate, the solution of which is very slightly acid, is transformed into monosodium dihydrogen orthophosphate, which has twice the alkali-neutralizing power of disodium monohydrogen orthophosphate. Similarly, pyrophosphoric acid and metaphosphoric acid may be converted by rehydration into orthophosphoric acid with an increase in alkali-neutralizing capacity. The conversion into the more acid condition is what may be termed a molecular rehydration, in that the water goes into chemical combination with the metaphosphate or pyrophosphate radical, causing an atomic rearrangement of the atoms of the molecule, as distinguished from the absorption of water of crystallization by solid phase which does not effect a rearrangement of the atomic linking within the molecule; and as distinguished from the hydrolysis of a salt dissolved in water, as, for instance, alkali metal alum or bismuth chloride dissolved in water.

The pyro- and meta-salts and acids may be considered as molecularly dehydrated forms of the ortho-salts and acids, since the dehydration effects an atomic rearrangement within the phosphate molecule, as distinguished from the so-called dehydration of orthophosphates by heating merely to drive off water of crystallization, or the double-decomposition reactions characterizing hydrolysis. Therefore, for convenience, we employ the expression "molecularly dehydrated" to distinguish as a class the pyro- hand meta-salts and acids from the ortho-salts and acids. Thus, for example, by the expression "molecularly dehydrated phosphate", we mean the pyro- or metaphosphate as distinguished from an orthophosphate from which merely water of crystallization has been driven off and which is sometimes referred to as "dehydrated" or "anhydrous" salt, and by a "molecularly dehydrated phosphate radical" we mean to include pyrophosphate radical ($P_2O_7$) or meta-phosphate radical ($PO_3$), one or the other of which is formed in the molecular dehydration or driving off of water from the orthophosphate acid or acid salts. The expression "phosphate" when used alone in the claims is intended as a term of general definition and not of limitation, and to include the orthophosphate, pyrophosphate and metaphosphate, unless one of such types of phosphate be specifically specified. Similarly, the expression "arsenate" is intended to include the orthoarsenate, pyroarsenate and metarsenate, unless one of such types of arsenate be specifically specified.

The alkali-metal normal salts of the pyrophosphates, when dissolved, give a pH value higher than that of pure water, those of the metaphosphates give a pH value practically the same or slightly less than that of pure water. And yet, as shown by the above reactions, their addition to the feed water results not in increased, but decreased alkalinity in the boiler water, since in the transformation into orthophosphate the pyrophosphate molecule supplies two molecules of disodium phosphate ($Na_2HPO_4$), the hydrogen of which is an acid hydrogen, and will neutralize its equivalent of alkalinity. Likewise, the metaphosphate molecule supplies one molecule of monosodium phosphate ($NaH_2PO_4$), whose two hydrogen atoms are acid hydrogen, and will likewise neutralize their equivalents of alkalinity. Likewise, use of pyro- or metaphosphoric acid as conditioning chemical results in greater neutralization of alkalinity in the boiler water than corresponds to the alkali-neutralizing capacity of the acids introduced.

Finally, the calcium salts of the pyrophosphates and the metaphosphates are much more soluble than tricalcic phosphate, and hence, the condition of supersaturation that so readily obtains upon addition of orthophosphate to the feed water occurs not at all or in very much less degree with addition of pyrophosphates or metaphosphates, thus preventing or minimizing the tendency to deposit scale in the feed water lines and heaters.

The solubility of the calcium salts of the pyrophosphates and the metaphosphates is high enough so that deposition thereof in feed-water heaters or feed-water lines is not liable to occur, unless considerable change of the pyrophosphate or metaphosphate into orthophosphate occurs therein. This change is a time reaction which will take place in heated alkaline solutions of the pyrophosphates and metaphosphates. Thus, if the system includes an economizer there is a tendency for some formation of scale therein due to the conversion of the calcium pyrophosphates or metaphosphates into calcium orthophosphates, which is difficultly soluble and which may be precipitated from a supersaturated solution thereof onto the walls of the economizer or water lines from the economizer to the boiler. If such tendency to the formation of a supersaturated solution of calcium orthophosphate is encountered, it may be counteracted by the addition to the feed water of one or two pounds per million pounds of feed water of cutch, quebracho extract, or similar tannin body. These tannin bodies apparently have the double function of retarding the rate of transformation of pyrophosphate or metaphosphate to orthophosphate, and of stabilizing a supersaturated solution of the orthophosphate, thus serving to inhibit the deposition of scale in the feed water heaters and lines.

Bodies other than the tannin bodies may be used as inhibitors to prevent the deposition of scale in the feed water heater and lines. Other inhibitors are the citrates, such as sodium citrate, lactates, gallates, alginates and gelatine. These inhibitors are, in general, organic bodies having large molecules which apparently both retard the rate of transformation of the pyrophosphate and metaphosphate to orthophosphate and serve to stabilize the supersaturated solution of the calcium orthophosphate. The addition of such inhibitors to feed water containing orthophosphate for stabilizing the supersaturated condition which may obtain in the feed lines is described and claimed in the copending application of Ralph E. Hall, one of the present applicants, Serial No. 409,417, filed of even date herewith. In the present case, the tannin bodies serve not only to stabilize the supersaturated condition of the feed water, as described in said copending Hall application, but in addition serve to retard the rate of transformation of pyrophosphate or metaphosphate to orthophosphate.

As described above, when the pyrophosphates or metaphosphates are carried by the feed water into the boiler and are there subjected to the continuing high temperature of the boiler water, the pyrophosphates and metaphosphates are transformed into acid orthophosphates, yielding not only acid hydrogen to neutralize excess alkalinity in the boiler water, but also furnishing orthophosphate radical, which serves to maintain the necessary equilibrium in the boiler water to prevent formation of adherent scale.

The necessary equilibrium conditions in the boiler water to prevent the formation of adherent scale are described in the Hall Patents, Nos. 1,613,656 and 1,613,701 of January 11, 1927. As described in said Hall patents, and especially in Patent No. 1,613,656, and with specific reference to the treatment with phosphate of boiler water containing calcium and sulphate, there should be maintained in the water in the boiler a concentration of orthophosphate ion not less than the concentration of sulphate ion to the three-halves power times the ratio of the solubility product of calcium phosphate to the one-half power to the solubility product of calcium sulphate to the three-halves power at the temperature of the water in the boiler, together with proper hydroxide concentration. When such a condition is maintained, the calcium is precipitated as tricalcic phosphate, which is a non-adherent sludge and which can be removed by blowdown, instead of calcium sulphate, which would form adherent anhydrite scale. In other words, in accordance with the Hall patents, there is maintained in the water in the boiler a sufficient concentration of orthophosphate to insure the precipitation of the calcium as non-adherent tricalcic sludge instead of the calcium sulphate scale. The proper tests for the relative concentration of phosphate and sulphate in the boiler water and directions for maintaining the necessary predominance of phosphate in the boiler water, are set forth in detail in said Hall patents and need not be repeated here, and reference may be had to said patents for such details.

The amounts of pyrophosphate or metaphosphate necessary to yield in the boiler water the requisite amount of available orthophosphate radical to insure the precipitation of the calcium and/or magnesium as non-adherent sludge instead of adherent scale, can be readily determined by testing the boiler water for phosphate and sulphate, as described in said Hall patents.

As an example in the use of these conditioning chemicals, consider a water containing 0.6 equivalents per million (30 parts per million) of temporary hardness and 0.2 equivalents per million (10 p. p. m.) of permanent hardness, both expressed in terms of $CaCO_3$. Sulphate concentration in the water is 12 parts per million. Let make-up be taken as 100%, blowdown as 2%, operating pressure as 400 pounds. No preliminary treatment is given the water other than possibly filtration for clarification. Under these conditions, 50 p. p. m. of available $PO_4$ in solution in the boiler water is sufficient. Conditioning this water completely with sodium metaphosphate dissolved in a convenient amount of water and fed directly at feed-water heater or other convenient point requires 28.3 pounds, approximately, of the anhydrous metaphosphate chemical per million pounds of the feed water. In order that the pH value of the feed water may be that required from the standpoint of preventing corrosion, 0.4 pounds of caustic soda may be added to the 28.3 pounds of metaphosphate. The solubility of the calcium salt of the metaphosphate is high enough so that deposition thereof in the feed-water heater and feed lines is not likely to occur, unless considerable change from metaphosphate to orthophosphate occurs therein.

But if the system includes an economizer and there is a tendency for some formation of scale therein, then simultaneous introduction with the metaphosphate of one or two pounds per million pounds of feed-water of cutch, quebracho extract, or similar tannin body, will stabilize the supersaturated condition and will retard the rate of transformation from metaphosphate to orthophosphate, so that deposition of scale will not occur.

In the boiler water, with a blowdown of 2%, the sulphate concentration is 600 parts per million. The alkalinity of the boiler water, if the water were treated with trisodium phosphate instead of sodium metaphosphate, would be 30.5 equivalents per million, (1617 p. p. m. expressed as sodium carbonate). But the metaphosphate, by its transformation into orthophosphate, has developed 27.75 equivalents per million of acidity, (sufficient to neutralize 1470 p. p. m. of sodium carbonate alkalinity). Thus the boiler water actually contains 2.75 eq. p. m. of alkalinity, corresponding to 147 p. p. m. total alkalinity calculated as sodium carbonate. The 600 p. p. m. of sulphate corresponds to 888 p. p. m. of sodium sulphate. The ratio of sodium sulphate to total alkalinity as sodium carbonate is 6, which is well above that recommended or proposed by the A. S. M. E. boiler code as protective from damage by "embrittlement".

This example serves to emphasize the fact that the simplest and best protection from the dangers of boiler-metal rupture is obtained by maintaining in the boiler water only the carefully defined minimum alkalinities that are essential from the standpoint of corrosion and economic use of the conditioning chemical.

In the case of pretreatment by zeolite, or direct treatment by trisodium phosphate, the impossibility of maintaining the desired sodium sulphate-alkalinity ratios without neutralization of a large part of the alkalinity developed in the boiler water is apparent from the fact that without such neutralization, sodium sulphate would have to be added to the feed water in sufficient quantity to yield $30 \times 30 \times 53 = 4770$ parts per million of sodium sulphate in the boiler water. With such concentrations of alkali and sodium sulphate in the boiler water, it is doubtful if all possible precautionary measures would avail in preventing carry-over of boiler water with the steam, at the ratings characteristic in modern practice.

The boiler-water alkalinity may be readily reduced still further. Thus, if 29 pounds of the sodium metaphosphate were used per million pounds of feed water, the boiler-water alkalinity would be 2.1 equivalents per million, or 111 parts per million of sodium carbonate. The concentration of available orthophosphate radical would then be 84 p. p. m.

If less alkali-neutralizing capacity is necessary in the boiler water, an alkali-metal pyrophosphate may be used in place of the alkali-metal metaphosphate, or more caustic soda or other alkaline chemical may be used therewith; if more alkali-neutralizing capacity is necessary, metaphosphoric acid or a mixture thereof with the alkali metal metaphosphate may be used.

In general, it is preferable for the boiler plant to maintain a stock of the treating phosphate in one form, for example, sodium metaphosphate. The sodium metaphosphate is very slightly acid in solution. If the raw water is somewhat alkaline or if the water from the primary treatment has sufficient alkalinity, sodium metaphosphate may be used alone for the secondary treatment. On the other hand, if the use of the sodium metaphosphate alone would cause too much acidity, it may be tempered by the addition of a suitable amount of some alkaline reagent, such as caustic soda.

While in the specific example cited above, the treatment was described as applied to a natural water, our treatment may be applied with particular advantage to boiler feed waters which have already undergone a primary treatment, such as the usual lime-soda ash treatment, or zeolite treatment, etc.

To carry out the lime-soda ash process most efficiently, some excess of the treating chemicals is required, which results in excess alkalinity in the treated water. By very careful proportioning of the treating chemicals, the alkalinity can be kept down, but it is advantageous for the efficiency of the process to use a sufficient excess of the treating chemicals which will result in an undesirably high alkalinity in the water if it were to be supplied to the boiler without partial neutralization. The use of the metaphosphates or pyrophosphates may, therefore, be applied with special advantage as a secondary treatment following the lime-soda ash primary treatment, in that the lime-soda ash treatment can be made more efficient, and the increased alkalinity which would result in too great alkalinity in the boiler can be counteracted therein by the acid hydrogen furnished by the rehydration in the boiler of the metaphosphate or pyrophosphate; and this is accomplished without destroying the desirable properties of the alkalinity resulting from the lime-soda ash treatment in preventing corrosion of the feed lines. In the continuous addition of the meta- or pyrophosphate in suitable proportion to the feed water, a relatively steady concentration of alkalinity obtains in the boiler water; we may say, however, that the alkalinity of the boiler water is decreased by such addition of the meta- or pyrophosphate in the sense that the rehydration of the meta- or pyrophosphate steadily furnishes acid hydrogen that neutralizes alkalinity which would otherwise concentrate in the boiler water.

The secondary treatment with the metaphosphate or pyrophosphate also supplements the partial removal of the calcium by the lime-soda ash treatment and precipitates such of the calcium as passes the lime-soda ash treatment to the boiler as a non-adherent orthophosphate sludge in the boiler, thus preventing the formation of scale by the residual calcium from the lime-soda ash treatment.

The zeolite treatment of the raw water, while removing in great part the calcium and magnesium therefrom, nevertheless leaves bicarbonate therein in the form of sodium bicarbonate which, in the boiler water, becomes caustic soda in large measure. The use of the treating chemicals as herein described, therefore, effectively supplements the zeolite treatment and obviates one of its particular disadvantages, namely, that of alkalinity concentration in the boiler from a zeolite-treated bicarbonate water. The acid hydrogen released by the rehydration of the metaphosphate or pyrophosphate counteracts this tendency for alkaline concentration in the water and at the same time, the orthophosphate developed in the rehydration takes care of the residual calcium not removed by the zeolite treatment.

Another advantage is realized in the use of the metaphosphates or pyrophosphates in boiler-water treatment, because of the relatively large solubility of their alkaline-earth metal salts. Thus, in their use for treatment of water for locomotive boilers, their addition to the wayside tank or to the tender of the locomotive produces no precipitation of sludge, with or without pretreatment as by lime-soda or zeolite, and therefore avoids all fouling of valves and supply lines. In the heated boiler water, rehydration of the meta- or pyro- to orthophosphate occurs, thus providing the essential conditions to prevent scale formation and at the same time providing simple control of the alkalinity concentration in the boiler water. Thus, their use, either directly or in conjunction with pretreatment by any of the water softening processes, combines all the advantages of clarity of feed water with full conditioning of the boiler water.

Thus, use of these materials that acquire alkali-neutralizing properties by transformations they undergo in the boiler water is extremely advantageous in that it permits ready maintenance of the desirable low alkalinities in the boiler water, without engendering difficulties from corrosion of the feed lines or the formation of deposits in the feed lines.

As a summary of advantages accruing in conditioning water for boilers from use of conditioning chemicals that undergo desirable transformations in the boiler water as already described, the following among others may be enumerated:

(1) Elimination or minimization of deposits in feed lines, economizers, heaters, desuperheatering equipment, etc., or in the wayside tanks or locomotive tenders.

(2) Possibility of maintenance of desirable pH values in the feed water to prevent corrosion without accumulation of alkalinity beyond desirable proportions in the boiler water.

(3) In most instances, complete elimination of the costly methods of directly feeding acid to the feed or boiler water and the exacting accuracy of control incident thereto, in an effort to maintain desirable concentration of alkalinity in the boiler water. In case, however, the alkalinity to be neutralized is enough so that acid must be used, then use of an acid, such as metaphosphoric, permits very dilute concentration thereof in feed water, since transformation in the boiler water increases the acidity—threefold in the case of metaphosphoric acid. This is of great advantage.

(4) Maintenance of scale-free boilers and simultaneously of the definite slight alkalinity in the boiler water that is essential in modern steam-generating practice. This is essential because—

(a) It minimizes any foaming tendency of the boiler water, and hence danger of carry-over in the steam.

(b) It simplifies the maintenance of sodium-sulphate-alkalinity ratios that are generally believed to be preventive of "embrittlement", and thus obviates largely or entirely addition of sodium sulphate beyond that in the natural water.

(c) It necessitates the least blowdown of the boiler.

While we prefer to use the alkali-metal (such as sodium or potassium) pyrophosphates and metaphosphates or the corresponding acids or acid salts, as set forth, the invention is not limited thereto, as we may use other chemicals as the alkali-metal pyro and meta-phosphites, pyro- and metarsenates. pyro- and metarsenites, or acids thereof, or other substances that possess one or both of the peculiar advantages herein noted, in particular the property of decreasing the alkalinity of the boiler water through transformations effected therein, while not interfering with, and at times aiding in maintenance of the desirable pH values in the feed water; and the property of forming relatively soluble compounds with calcium and magnesium before, but very insoluble compounds after, the transformation.

At times it may be advisable to use a mixture of pyrophosphate and metaphosphate or of alkali-metal metaphosphate and metaphosphoric acid. The presence of a small amount of pyrophosphate in the metaphosphate assures a practically neutral salt which is more readily soluble than a salt containing free metaphosphoric acid. Or it may be desired to add somewhat of orthoarsenate, metarsenate or pyroarsenate to a metaphosphate, or pyrophosphate, as when additional protection from corrosion is desired by the suitable application of electric current to the boiler water through suitable electrodes.

When phosphate and arsenate are simultaneously present in the boiler water, the calcium combines with phosphate in preference to arsenate, and thus continuity of the maintenance of the arsenate for the prevention of corrosion is assured.

The pyrophosphate or metaphosphate or other treating chemical of the character herein described, may be added to the cold feed water before it passes through the feed water heater, or it may be added to the hot water from the feed water heater before this water is pumped into the boiler, or it may be supplied in any other convenient way either to the feed water or directly to the boiler. Therefore, when we speak in the claims of supplying the boiler water with the treating chemical, we mean to include either supplying the chemical to the feed water to pass with the feed water into the boiler, or supplying the treating chemical directly to the boiler. For example, the sodium metaphosphate may be added to the cold feed water and if the feed water is not sufficiently alkaline, some alkaline reagent, such as sodium hydroxide or sodium pyrophosphate, may be added to insure sufficient alkalinity to protect the feedwater heater and feed lines against corrosion.

By taking advantage of the capability of the chemicals as above described, of being transformed in the boiler into a more acid condition, such chemicals may be injected into the boiler without destructive corrosive acid attack upon the injecting pumps and supply lines.

The rehydration of the metaphosphate and pyrophosplate present is a time action and takes place sufficiently slowly so that ordinarily the conversion into orthophosphate does not take place sufficiently to cause precipitation of calcium orthophosphate in the feed water heater. The solubility of calcium metaphosphate and calcium pyrophosphate is great enough so that there is little if any tendency for the precipitation of these calcium salts in the feed water heater.

The supplying of the metaphosphate or other chemical to the cold water has the advantage of supplying all of the treating chemicals at one point. However, when the feed water contains a relatively large amount of calcium or when the flow through the feed water heater is not rapid, it may be advantageous to add the phosphate to the feed water after it has passed beyond the feed water heater. This shortens the time during which the metaphosphate or pyrophosphate is in contact with the hot water before it enters the boiler, and allows less chance of rehydration and the formation of solid phase prior to the entry of the water into the boiler where the rehydration is desired.

The following may be cited as a specific example of the addition of the meta- or pyrophosphate and the control of the reaction so as to prevent separation of solid phase prior to the entry of the feed water into the boiler.

In a boiler plant provided with a primary feed water heater and a secondary feed water heater, such as an economizer or a heater heated by a steam bled from a turbine, the feed water is ordinarily brought to a temperature of about 212° F. in the first or primary heater, which usually has a relatively large storage capacity. The feed water is then passed through the secondary heater where its temperature may be raised to, say, 350° or 400° F., or even more, depending upon the temperature of the boiler water, and thence directly into the boiler.

Under such conditions, it is preferable to add the meta- or phyrophosphate to the feed water between the first heater and the second heater or economizer. This shortens the time during which the meta- or pyrophosphate is in contact with the water, and thus minimizes the extent of the rehydration which may begin at the temperatures encountered in the economizer or second high temperature heater. By adding the meta- or pyrophosphate at this point, the reaction does not have a chance to start in the first heater in which the retention time may be relatively long, due to the storage capacity of this heater. The water, after the addition of the meta- or pyrophosphate, is passed relatively rapidly through the economizer or second heater, so that the reaction of rehydration does not have an opportunity to go sufficiently to completion to cause objectionable separation of solid phase in the economizer or second heater.

Also, while the invention has been particularly described with reference to steam boilers supplying steam for power purposes, it may be advantageously employed in the conditioning of water for other boilers, and by the term "boilers", we intend to include various devices in which water is evaporated, such as the so-called evaporators used for producing distilled water for use as feed water or the like.

Our process may also be employed in connection with pressure vessels holding solutions, the alkalinity of which it may be desired to decrease, and at the same time protect the pumping equipment or supply lines against corrosive attack. Thus, for example, a digester may be supplied with chemical having the characteristics herein described of being transformed into a condition of greater alkali-neutralizing power, whereby the supply pumps are not subjected to the acid attack and the latent acidity of the chemical is developed in the digester where desired.

While we have specifically described the preferred embodiment of our invention, it is to be understood that the invention is not limited to the hereinbefore described details, but may be otherwise embodied and practiced within the scope of the following claims.

We claim:

1. The process of treating the water in a steam boiler, which comprises supplying to the boiler water a chemical containing a molecularly dehydrated phosphate radical which is rehydrated in the water in the boiler to a condition of greater alkali-neutralizing capacity.

2. The process of treating feed water for a steam boiler provided with a feed line, which comprises supplying to the feed water a molecularly dehydrated phosphate which is rehydrated in the water in the boiler to a condition of greater alkali-neutralizing capacity, whereby the excess alkalinity in the boiler water is neutralized without proportionately decreasing the alkalinity of the water in the feed line.

3. The process of treating water for steam boilers, which comprises supplying thereto a molecularly dehydrated phosphate radical which is rehydrated in the water in the boiler to yield acid hydrogen which neutralizes excess alkalinity in the boiler, and orthophosphate which prevents the deposition of adherent boiler scale.

4. The process of treating water for steam boilers, which comprises supplying thereto a sufficient amount of a molecularly dehydrated phosphate radical to yield upon rehydration in the water in the boiler sufficient acid hydrogen to maintain an alkalinity therein between pH values of about 10 to 11½ and to yield sufficient orthophosphate to prevent the deposition of adherent boiler scale.

5. The process of treating water for stear· boilers, which comprises supplying thereto a mixture containing a molecularly dehydrated phosphate and an arsenate.

6. The process of treating water for steam boilers containing a scale-forming metal of the second group of the periodic system, which comprises the steps of subjecting the feed water to a primary lime-soda ash or zeolite treatment, and subjecting the water in the boiler to a secondary treatment with a molecularly dehydrated phosphate.

7. The process of treating feed water for a boiler, which comprises supplying condensate to the boiler together with make-up water, adding a molecularly dehydrated phosphate to the mixture and passing it to the boiler.

8. The process of treating calcium- and sulphate-containing feed water for a steam boiler, which comprises maintaining the feed water at a pH value of not less than about 8 to prevent corrosion of the feed lines, and introducing into the water a molecularly dehydrated phosphate in an amount sufficient to maintain the water in the boiler at a pH value of not over about 11½ and to provide a sufficient concentration of phosphate in the water to insure the precipitation of the calcium in the boiler water as tricalcic phosphate instead of calcium sulphate.

9. The process of treating feed water for a steam boiler, which comprises supplying to the feed water a molecularly dehydrated phosphate together with an inhibitor.

10. The process of treating feed water for a steam boiler, which comprises supplying to the feed water a molecularly dehydrated phosphate together with a tannin body as an inhibitor.

11. The process of treating water for steam boilers, which comprises supplying to the water a molecularly dehydrated phosphate and a regulated amount of an alkaline reagent.

12. The process of treating water for steam boilers, which comprises supplying to the water sodium metaphosphate and a regulated amount of sodium hydroxide.

13. The process of treating water for steam boilers, which comprises supplying to the water a mixture containing a metaphosphate, a pyrophosphate, and a regulated amount of an alkaline reagent.

14. The process of treating water for steam boilers, which comprises supplying to the water a mixture containing a metaphosphate and a pyrophosphate.

15. The process of treating the water in a steam boiler, which comprises supplying to the boiler water a chemical containing an alkali metal metaphosphate.

16. The process of treating the water in a steam boiler, which comprises supplying to the boiler water a chemical containing an alkali metal pyrophosphate.

17. The process of controlling the alkalinity of a heated water solution in a pressure vessel, which comprises supplying thereto a molecularly dehydrated treating chemical which is transformed therein with a time reaction to a condition of greater alkali-neutralizing capacity, said chemical being supplied in an amount sufficient to effectively regulate their alkalinity, whereby the alkalinity in the vessel is decreased and acid attack on the supply equipment is minimized.

18. The process of controlling the alkalinity of the water in a steam boiler provided with a feed line, which comprises supplying to the feed water a molecularly dehydrated acid radical which is transformed by rehydration in heated solution with a time reaction to a form having a greater alkali-neutralizing capacity, said molecularly dehydrated radical being supplied in an amount sufficient to effectively regulate the alkalinity of the water in the boiler, whereby the alkalinity of the water in the boiler is decreased without proportionately decreasing the alkalinity of the water in the feed line, and supplying the thus-treated feed water through the feed line into the boiler.

In testimony whereof we have hereunto set our hands.

RALPH E. HALL.
HENRY A. JACKSON.

CERTIFICATE OF CORRECTION.

Patent No. 1,903,041.  March 28, 1933.

RALPH E. HALL, ET AL.

It is hereby certified that error appears in the printed specification of the above numbered patent requiring correction as follows: Page 5, line 97, beginning with the words "The addition" strike out all to and including the syllable "phate" in line 111; page 6, line 120, in the equation, for "30" first occurrence, read "3"; page 8, line 118, for "action" read "reaction"; page 9, line 101, after "line" insert the words "and supplying the thus treated feed water through the feed line into the boiler"; and that the said Letters Patent should be read with these corrections therein that the same may conform to the record of the case in the Patent Office.

Signed and sealed this 16th day of May, A. D. 1933.

(Seal)  M. J. Moore,
Acting Commissioner of Patents.